(12) United States Patent
Münch et al.

(10) Patent No.: US 10,488,254 B2
(45) Date of Patent: Nov. 26, 2019

(54) SPECTROMETER WITH TWO-DIMENSIONAL SPECTRUM

(71) Applicant: Analytik Jena AG, Jena (DE)

(72) Inventors: Stefan Münch, Berlin (DE); Michael Okruss, Potsdam (DE)

(73) Assignee: Analytik Jena AG, Jena (DE)

( * ) Notice: Subject to any disclaimer, the term of this patent is extended or adjusted under 35 U.S.C. 154(b) by 0 days.

(21) Appl. No.: 16/069,912

(22) PCT Filed: Dec. 20, 2016

(86) PCT No.: PCT/EP2016/081932
§ 371 (c)(1),
(2) Date: Jul. 13, 2018

(87) PCT Pub. No.: WO2017/121583
PCT Pub. Date: Jul. 20, 2017

(65) Prior Publication Data
US 2019/0025121 A1 Jan. 24, 2019

(30) Foreign Application Priority Data

Jan. 14, 2016 (DE) .................... 10 2016 100 580

(51) Int. Cl.
*G01J 3/18* (2006.01)
*G01J 3/14* (2006.01)
(Continued)

(52) U.S. Cl.
CPC .......... *G01J 3/1809* (2013.01); *G01J 3/0208* (2013.01); *G01J 3/14* (2013.01); *G01J 3/2803* (2013.01);
(Continued)

(58) Field of Classification Search
CPC .......... G01J 3/1809; G01J 3/0208; G01J 3/14; G01J 3/2803; G01J 3/2823; G01J 2003/1828
See application file for complete search history.

(56) References Cited

U.S. PATENT DOCUMENTS

| 2011/0285993 A1* | 11/2011 | Becker-Ross | G01J 3/02 356/305 |
| 2012/0262713 A1* | 10/2012 | Florek | G01J 3/02 356/319 |

FOREIGN PATENT DOCUMENTS

| DE | 102009059280 A1 | 6/2011 | |
| DE | 102011080278 A1 | 2/2013 | |
| WO | WO2013017458 | * 2/2013 | ............ G01J 3/0208 |

OTHER PUBLICATIONS

Agócs, Tibor, et al. "A set of innovative immersed grating based spectrometer designs for METIS." Advances in Optical and Mechanical Technologies for Telescopes and Instrumentation. vol. 9151. International Society for Optics and Photonics, 2014 (Year: 2014).*

(Continued)

*Primary Examiner* — Dominic J Bologna
(74) *Attorney, Agent, or Firm* — Kelly J. Smith; PatServe (57) ABSTRACT

A spectrometer arrangement with two-dimensional spectrum, comprising a first dispersing element for spectral separation of radiation in a main dispersion direction, an imaging optics for imaging the radiation entering into the spectrometer arrangement through an entrance slit in an image plane for producing a two-dimensional spectrum, and a detector array with a two-dimensional arrangement of a plurality of detector elements in the image plane, wherein a reflector, a refractor, and/or a lens array are arranged in the beam path at a location where the dispersed, monochromatic beams are separated from one another, and the reflector, the refractor, and/or the lens array have a surface in the form of (Continued)

a freeform surface, such that area occupied by selected images of the entrance slit in the case of different wavelengths in the image plane is optimized over a selected spectral region of the two-dimensional spectrum.

16 Claims, 7 Drawing Sheets

(51) Int. Cl.
    *G01J 3/28*     (2006.01)
    *G01J 3/02*     (2006.01)

(52) U.S. Cl.
    CPC ..... *G01J 3/2823* (2013.01); *G01J 2003/1828* (2013.01)

(56) References Cited

OTHER PUBLICATIONS

English Machine translation of WO2013017458A1 (Year: 2013).*
International Search Report for PCT Application No. PCT/EP2016/081932, WIPO, dated Jun. 12, 2017, 19 pages.
Tibor Agocs, Ramon Navarro, Lars Venema, Aaldert H. van Amerongen, Paul J.J. Tol, Hedser van Brug, Bernhard R. Brandl, Frank Molster and Stephen Todd, A set of innovative immersed grating based spectrometer designs for METIS, Advances in Optical and Mechanical Technologies for Telescopes and Instrumentation, Proc. of SPIE vol. 91515, 91511L (Downloaded From: http://proceedings.spiedigitallibrary.org/ on Mar. 4, 2015 Terms of Use: http://spiedl.org.terms), 11 pp.
Li Xu, Kexin Chen, Qingsheng He and Guofan Jin, Design of freeform mirrors in Czerny-Turner spectrometers to suppress astigmatism, Applied Optics, May 20, 2009, vol. 48, No. 15, pp. 2871-2879.

* cited by examiner

Prior Art

Prior Art

SPECTROMETER WITH TWO-DIMENSIONAL SPECTRUM

CROSS-REFERENCE TO RELATED APPLICATIONS

The present application is related to and claims the priority benefit of German Patent Application No. 10 2016 100 580.0, filed on Jan. 14, 2016 and International Patent Application No. PCT/EP2016/081932, filed on Dec. 20, 2016, the entire contents of which are incorporated herein by reference.

TECHNICAL FIELD

Background

The invention relates to a spectrometer arrangement with two-dimensional spectrum containing
(a) a first dispersing element for spectral separation of radiation in a main dispersion direction,
(b) an imaging optics for imaging the radiation entering into the spectrometer arrangement through an entrance slit in an image plane for producing a two-dimensional spectrum, and
(c) a detector array with a two-dimensional arrangement of a plurality of detector elements in the image plane.

An example of such a spectrometer arrangement is an echelle spectrometer with internal order separation. A further example is a long-slit spectrometer arrangement.

In the case of an echelle spectrometer, gratings with a stepped (echelle is French for staircase) cross section are used. By the step-like structure with a corresponding blaze angle, a diffraction pattern is produced, which concentrates the diffracted intensity in high orders, e.g. fiftieth to one hundredth order. In this way, high spectral resolutions can be achieved coupled with compact arrangement. The orders can—depending on incoming wavelengths—superimpose. The orders are in the case of echelle spectrometers with internal order separation yet again dispersed transversely to the dispersion direction of the echelle grating, in order to separate the different arising orders. In this way, a two-dimensional spectrum is obtained, which can be registered with detector arrays.

An echelle spectrometer with internal order separation differs from echelle spectrometers with external order separation in that in the latter case only radiation from a small spectral region enters into the spectrometer. In the case of spectrometers with internal order separation, the spectrum is produced in the form of a two-dimensional structure in the detector plane. This structure is composed of essentially mutually parallel, spectral sections. The free spectral regions of the various diffraction orders give together a gapless spectrum for a certain wavelength range. The application of a detector array with a large number of detector elements permits the simultaneous registering of a large wavelength region with high spectral resolution.

The cross dispersion is, usually, selected sufficiently great that the orders are everywhere completely separated. In order to assure this over the total spectral region, there are spectral regions, where an unused, intermediate space arises between the individual orders. Thus, there arise in the case of application of a prism for cross dispersion in the short-wave spectral region due to the higher dispersion greater intermediate spaces than in the longwave spectral region.

Disadvantageous in the case of known arrangements is that the detectors in general must be very large, when larger spectral regions with high resolution and sufficient etendue should be registered.

In the case of atomic absorption spectroscopy and many other spectroscopic detection methods, the limit of detection depends, among other things, on the etendue of the applied spectrometer and on the sensitivity of the arrangement. A higher spectral resolution leads in the cases, where the resonance line applied for the analysis is not resolved, to a higher sensitivity. The spectral resolution of the arrangement depends on, among other things, the slit width, the dimensions of the detector elements in the main dispersion direction of the echelle grating and the image quality. It is thus desirable to obtain a high spectral resolution in the case of simultaneously high etendue.

The imaging of a spectral fraction of a point of the light source is burdened always with certain imaging errors. Generally, imaging errors are categorized according to the aberration theory of Seidel. In optical spectroscopy, especially the imaging errors, astigmatism, coma and spherical aberrations, are considered. Due to the spatial separations of the beams for the different wavelengths and the different paths resulting therefrom, the beams of different wavelengths are affected differently strongly by the imaging errors. A comprehensive handling of the imaging errors for all beams is only conditionally possible. Especially affected by the imaging errors are optical spectrometers using a large aperture ratio and/or a large entrance pupil and/or a large image field.

In the case of spectrometers with refractive imaging optics, in addition to the above geometric aberrations, chromatic aberrations are present, especially longitudinal chromatic aberrations.

It can be shown that imaging errors, such as astigmatism and coma, lead to the fact that the image of a point shaped, monochromatic light source extends over a detector plane region, which includes a plurality of detector elements. If the image includes a plurality of detector elements in the main dispersion direction, the spectral resolution lessens correspondingly. The measuring of a signal with a plurality of detector elements leads to an increase of the read-out noise, so that the signal-to-noise ratio and therewith the limit of detection of analytical measurements is degraded.

The echelle spectrometer arrangement known under the name, "MOSES", is described in DE 10 2009 059 280 A1 and EP 2 516 975 B1. The arrangement includes especially few components and a high etendue. The arrangement is provided with an echelle spectrometer with internal order separation in a Littrow arrangement. The entire spectrum is imaged on one detector. Various dispersion arrangements, including a reflecting prism, are disclosed for cross dispersion.

An echelle spectrometer arrangement with astigmatism compensation is disclosed in DE 100 11 462 C2. The arrangement shows an echelle spectrometer with internal order separation with two entrance slits of different orientation, which are arranged along the optical path in separated planes. In this way, an astigmatism compensation is achieved for only one point in the image plane.

Known under the terms, "Schmidt plate" or "Schmidt correction plate" are rotationally symmetric dioptric optics, which are used for correction of spherical aberration, coma and astigmatism, in among others, different telescope types, such as Schmidt telescopes or Schmidt Cassegrain telescopes.

In the publication "Design of freeform mirrors in Czerny-Turner spectrometers to suppress astigmatism" by Li Xu, Kexin Chen, Qingsheng He and Guofan Jin in Appl. Optics. Vol. 48, No. 15, Pg. 2871 of 20 May 2009, the correction of astigmatism in one-dimensional spectra in a Czerny-Turner spectrometer is described. In such case, the shape of the comparatively large camera mirror is changed to a freeform surface. In a second step, for additional coma compensation, also the collimator mirror is embodied as a freeform surface. Disadvantageous in the case of this arrangement is that the beams for different wavelengths strongly overlap at these two locations.

CN 103 175 611 B discloses a Czerny-Turner spectrometer, wherein before the detector a lens element with a freeform surface is arranged. The curvature of the surface in the dispersion direction takes into consideration the correction of coma. The curvature of the surface perpendicular to the dispersion direction takes into consideration the correction of astigmatism. The shape of the freeform-surface is ascertained by calculation, in that the imaging errors, coma and astigmatism are functionally ascertained and a correction function calculated therefrom. Other errors are not taken into consideration.

WO 2013 106 307 A1 discloses the correction of astigmatism and coma with the assistance of rotationally symmetric, aspherical, correction plates.

DE 695 182 44 T2 discloses a method for order harmonizing by applying combinations of prisms.

U.S. Pat. No. 8,681,329 B2 discloses a method for order harmonizing with application of a pre-dispersion optics, and EP 0 744 599 B1 discloses an echelle spectrometer with an echelle grating and a second grating for production of a cross dispersion. The second grating is composed of a plurality of sections for producing the dispersion in different spectral sections, for example, UV and VIS. The publication discloses that the grating can be embodied rotationally symmetrically and aspherically, i.e. that the grating surface is not planar, but, instead, can be curved rotationally symmetrically for correction of aberrations. The grating is arranged parallel to the beam path having overlapping beams.

EP 0 445 934 B1 discloses an echelle spectrometer in Littrow arrangement with a prism for production of a cross dispersion. The radiation is reflected via a hyperbolic secondary- and an aspherical, rotationally symmetric, main mirror onto the grating and then back on itself. The mirrors are arranged in the beam path at different locations having overlapping beams.

EP 1 260 802 B1 discloses a prism spectrometer with a one-dimensional spectrum. The collimator arrangement and/or the camera arrangement of the spectrometer are/is provided with an aspherically curved correction mirror for correction of axial and off-axis spherical aberrations. Other imaging errors are not taken into consideration. The publication discloses various other spectrometer arrangements with different aspherical correction areas, which all are located in the parallel beam path between collimator and camera.

SUMMARY

It is an object of the invention to provide an echelle spectrometer arrangement of the aforementioned type with a two-dimensional spectrum and improved detection. According to the invention, the object is achieved by features including that (d) a reflector, a refractor, a lens array or another optical element is arranged in the beam path at a location where the dispersed, monochromatic beams are present separated from one another, and (e) the reflector, the refractor, the lens array or the other optical element has a surface in the form of a freeform surface, in the case of which area occupied by selected images of the entrance slit in the case of different wavelengths in the image plane is optimized over a selected spectral region of the two-dimensional spectrum.

Of course, the selected images have an intensity variation, so that the area does not have a sharp edge. In this case, under the concept "area" that region is understood, in which a high percentage, e.g. 90 to 99%, of the intensity strikes the detector.

In the case of this arrangement, the relative beam overlapping is small. The relative beam overlapping is a percentage and can be calculated explicitly for two wavelengths. The relative beam overlapping at a certain site in the beam path is the reciprocal arithmetic ratio between the beam cross-sectional area of a selected monochromatic beam at such site and the area portion thereof, which is likewise occupied by a second monochromatic beam. The freeform surface is arranged at a position, where the relative beam overlapping is less than on the camera mirror. The relative beam overlapping fulfills this condition only between camera mirror and detector and in the convergent and divergent beam path in the region of an intermediate image. It does not fulfill this condition, however, in the parallel beam path, for instance, at the echelle spectrometer.

Surfaces of mirrors, lenses and the like applied in optics have usually a rotational symmetry or are sections of surfaces, which have a rotational symmetry, for example, spheres, paraboloids or ellipsoids. In this regard belong also surfaces, where the rotational symmetry axis does not pass through the area. Such is the case, for example, for cylindrical surfaces or toroidal surfaces. Additionally belonging are anamorphic surfaces or surface sections of higher order, which have a mirror symmetry. Freeform surfaces are other surfaces, namely surfaces, whose form deviates from that of rotationally symmetric or mirror symmetric surfaces or surface sections.

A two-dimensional spectrum can especially be produced with an arrangement, which has a second dispersing element for order separation by means of spectral separation of the radiation in a cross dispersion direction, which forms an angle with the main dispersion direction of the first dispersing element, so that a two-dimensional spectrum is producible. Known, however, are also long-slit spectrometers, which have only one dispersing element. The second direction corresponds to the extended slit height.

The optimizing of the freeform surface can occur in such a manner that the imaging error caused totality of deviations from a stigmatic imaging of selected images of the entrance slit for different wavelengths in the image plane is minimized over a selected spectral region of the two-dimensional spectrum. In this way, small images of the entrance slit are produced, which are easy to detect. Alternatively or supplementally, the optimizing occurs in such a manner that the orders are arranged with desired separations from one another in the image plane.

Preferably, it is provided that the element dispersing in the main dispersion direction is an echelle grating. In such case, it can especially be provided that the spectrometer is an echelle spectrometer with internal order separation.

Fundamentally, the invention is also relevant for spectrometers with external order separation, e.g. echelle spectrometers with external order separation and high slit, wherein the aberrations are limited over the entire slit height by one or more freeform surfaces. It is, furthermore, possible to provide a prism spectrograph in MOSES arrangement without echelle grating with very high slit (long-slit) and freeform mirror.

The invention is relevant for spectrometers with 2D-spectra. In the main dispersion direction, the radiation is spectrally separated by a first dispersion element. Direction is used either for another spectral separation or for a division according to location (field coordinates).

Other than in the case of known arrangements, in the case of the present invention, the area of a large number of images of the entrance slit is considered. Instead of an image of the entrance slit, in the case of application of a beam calculation program also the images of an individual point, i.e. an infinitesimally small entrance slit, can be considered for a large number of wavelengths. It is not required to ascertain the causes of the area form and -size of the images or even to describe them functionally. Rather, the result is optimized in the exit plane by fitting the freeform surface.

With such an arrangement, on the one hand, a higher resolution can be achieved. On the other hand, the distribution of the orders on the detector can be influenced. Especially, a uniform or more uniform distribution can be achieved. It is also possible to configure the freeform surface in such a manner that only selected wavelength regions, e.g. the wavelengths in the edge region of the detector, are influenced.

By suitable forming and positioning of one or more freeform surfaces in the spectrometer arrangement, a considerable reduction of the imaging errors can be achieved.

Especially, a reflecting, refracting or diffracting surface can be arranged at a location in the beam path, where at least two monochromatic beams associated with the same echelle diffraction order are completely separated and/or where at least two monochromatic beams, which do not belong to the same echelle diffraction order, are completely separated and the reflecting, refracting or diffracting surface is embodied as a freeform surface, which minimizes deviation from a stigmatic imaging on the detector for the individual monochromatic beams over a selected wavelength range of the two-dimensional echelle spectrum independently of one another.

For description and production of the freeform surfaces, different methods can be applied. Either closed mathematical expressions are used. Examples in such case are Chebyshev polynomials of first type or Zernike polynomials. Chebyshev polynomials are rather suitable for rectangular surfaces.

Zernike polynomials are rather suitable for round areas. With the mathematical expressions, also the deviations from a basic form, for instance, a plane, a rotational paraboloid or another rotationally-symmetric surface can be described. Alternatively, the freeform surface can be described by application of a network of support points. The support points enable the sectional mathematical description of the surface. This can occur, for example, using various spline-functions, bicubic interpolation and the like. In the case of certain mathematical descriptions, the support points are not necessarily part of the surface (this relates to especially spline functions). Support points are expressed, for example, as coordinates or wavelengths. The point grid for the surface description should at least cover the surface, via which the beams of all relevant wavelengths travel.

The determining of the optimal form, i.e. the parameters of the freeform surface, occurs preferably with application of a beam calculation program. Usually, first, a suitable mathematical goal function, also referred to as a merit function, is formulated. The merit function brings together the different individual goals for the optical model. An individual goal is expressed by a mathematical operand, associated with a target value, which the operand should achieve.

A possible formulation of the merit function mf is:

$$mf = \sqrt{\frac{\sum_{i=1}^{m} w_i \varphi_i^2}{\sum_{i=1}^{m} w_i}}.$$

In such case, $\varphi_i$ is the deviation of the i-th operand, whose actual size $v_i$ can be derived from the optical model, from a desired target variable $t_i$:

$$\varphi_i = v_i - t_i$$

Then, it is determined, which parameters of the optical system are changeable. The changeable parameters include parameters of one or more freeform surfaces. With the help of optimizing algorithms, variable parameter values are sought, which best fulfill the goals of the optical model, i.e. such that the value of the goal function as far as possible approximates the value 0. The value 0 of the merit function means comprehensive achieving of all defined target specifications of the optical model. The found parameters enable, for example, the minimizing of the totality of deviations from a stigmatic imaging for selected images of entrance slit points in the case of different wavelengths in the image plane.

In the case of a variant of the invention, it is provided that the freeform surface is optimized in such a manner that the sum of the RMS functions (Root Mean Square function) of selected images of the entrance slit in the selected spectral region assumes a minimum. This function describes the image quality over the entire image field. In such case, it can especially be provided that individual RMS values are taken into consideration with weighting. Alternatively, it is provided that the freeform surface is optimized in such a manner that the sum of the wavefront errors of selected images of the entrance slit in the selected spectral region assumes a minimum.

In the case of a preferred embodiment of the invention, it is provided that the freeform surface is optimized in such a manner that the sum of the areas of selected images of the entrance slit, i.e. the totality of the deviations from a stigmatic imaging, assumes a minimum for selected images in the selected spectral region. The freeform surface can be optimized by optimizing different parameters. Depending on position in the image field, the deviations from stigmatic imaging for the individual images can be differently weighted. Especially, also the spreads in the main dispersion direction and in the cross dispersion direction can be differently weighted for the individual images.

In a special embodiment of the invention, it is provided that the freeform surface is optimized in such a manner that the totality of the deviations from a stigmatic imaging for selected images of different spectrometer configurations assumes a minimum. This relates especially to spectrometers, which register different wavelength ranges sequentially. Also in this case, the goal setting of minimum deviation from stigmatic imaging can be differently weighted for the individual images.

The deviation from stigmatic imaging for an image of the entrance slit can be determined by evaluating the scattering of intersections of discrete virtual rays of a monochromatic beam with the detector plane. Usual measure for the spread caused by the scattering is the Root Mean Square function (RMS).

Alternatively, it is provided that the freeform surface is optimized in such a manner that the totality of the weighted wavefront errors of selected images of the entrance slit assumes a minimum in the selected spectral region.

The goal function can, furthermore, take the order separations into consideration, so that the differences of the order separations over the entire image field are minimized by optimizing the freeform surface.

In the case of an especially preferred embodiment of the invention, the optical element with the freeform surface is a folding mirror before the detector. "Before" means here that the folding mirror is the last light conducting, optical element in the beam path before the detector. There, the beams of various wavelengths are already separated as far as possible. The relative beam overlapping is less than at the camera mirror. This permits a wavelength dependent fitting. On the path from the imaging optics to the detector, the diameter of the beam gets increasingly smaller. In this way, the application of smaller mirrors is enabled with freeform surface. The overlapping of the beams of various wavelengths is likewise lessened. Correspondingly, the local fitting of the applicate, i.e. the local z-coordinate of the surface and the curvature can be used for optimizing the imaging quality of the monochromatic beams. A mirror corrects the imaging quality for the different beams, furthermore, independently of their wavelengths. This is especially important for dynamic spectrometer systems, where different spectral sections can be registered.

Preferably, it is provided that the imaging optics have a Littrow arrangement. Then, only small imaging errors need to be corrected.

In an additional embodiment of the invention, it is provided that the collimator- and/or camera optics is implemented by lenses or lens systems. The optical element with the freeform surface is here supplementally to the correction of the geometric aberrations also applied for minimizing the chromatic aberrations, which are produced by the imaging lenses.

In the case of an additional embodiment of the invention, it is provided that the second dispersing element is a prism with a surface, which is likewise embodied as a freeform surface, and the freeform surfaces have a shape, in the case of which the imaging error caused deviations from a stigmatic imaging of selected images of the entrance slit in the case of different wavelengths in the image plane are optimized over a selected spectral region of the two-dimensional echelle spectrum. It is, however, also an option that one or more additional freeform surfaces are placed in the beam path by means of special optical elements, for example, additional mirrors or lenses. It has been found that the image quality over the image field is further improvable, when a plurality of freeform surfaces independently influence the beam. Due to the, in total, greater number of surface parameters in the case of the application of a plurality of freeform surfaces, more degrees of freedom are available for the optimizing, in order especially effectively to limit imaging errors of higher order.

In the case of an especially preferred embodiment of the invention, it is provided that at least one freeform surface is embodied in such a manner that the orders assume a selected position in the image plane and preferably have uniform separations in the image plane. When, for example, a quartz prism is used for separating the orders in the cross dispersion direction in a conventional arrangement, the orders in the long-wave spectral region lie closer together than in the shortwave spectral region. For clean detecting of the spectra, there needs to be a certain separation between neighboring orders. In the case of order separation with a quartz prism, the separation is, however, always greater toward the shortwave spectral region. In this way, a substantial part of the detector area remains unused. The relative shifting of the images of the orders can prevent this effect: when the order separations in the shortwave spectral region are lessened by suitable shaping of the freeform surface, a smaller detector can be used. An increasing of the order separation in the long-wave spectral region enables a greater slit height of the entrance slit in the cross dispersion direction and so a greater etendue.

Freeform mirrors can be embodied as rigid bodies. Suited for this are a reflecting coating on a substrate or a polished metal mirror. It is, however, also possible, to implement reflecting surfaces using dynamic systems and adaptive optics, in order to adjust to dynamically variable imaging conditions. In the case of an embodiment of the invention, it is, consequently, provided that the freeform surface is formed of a plurality of micro mirrors, whose position is adjustable by means of corresponding actuators.

An especially advantageous embodiment of the invention results, when existing spectrometers are retrofitted with a freeform surface. In this way, the resolution and performance of existing spectrometers can be improved without much extra effort. The invention, includes, consequently, especially also an optical component with a surface in the form of a freeform surface for retrofitting a spectrometer arrangement, wherein the freeform surface optimizes imaging error caused area occupied by selected images of the entrance slit in the case of different wavelengths in the image plane over a selected spectral region of the two-dimensional echelle spectrum.

The described spectrometer arrangement can have a radiation source with continuous spectrum between 190 nm and 860 nm, especially a Xe high pressure, short arc lamp. It is suited especially for atomic absorption spectroscopy (AAS).

The described spectrometer arrangement can have an inductively coupled plasma (ICP). It is suited also for optical emission spectroscopy (ICP-OES).

Embodiments of the invention are subject matter of the dependent claims. An example of an embodiment will now be explained in greater detail with reference to the appended drawing.

DETAILED DESCRIPTION

Figure 1:
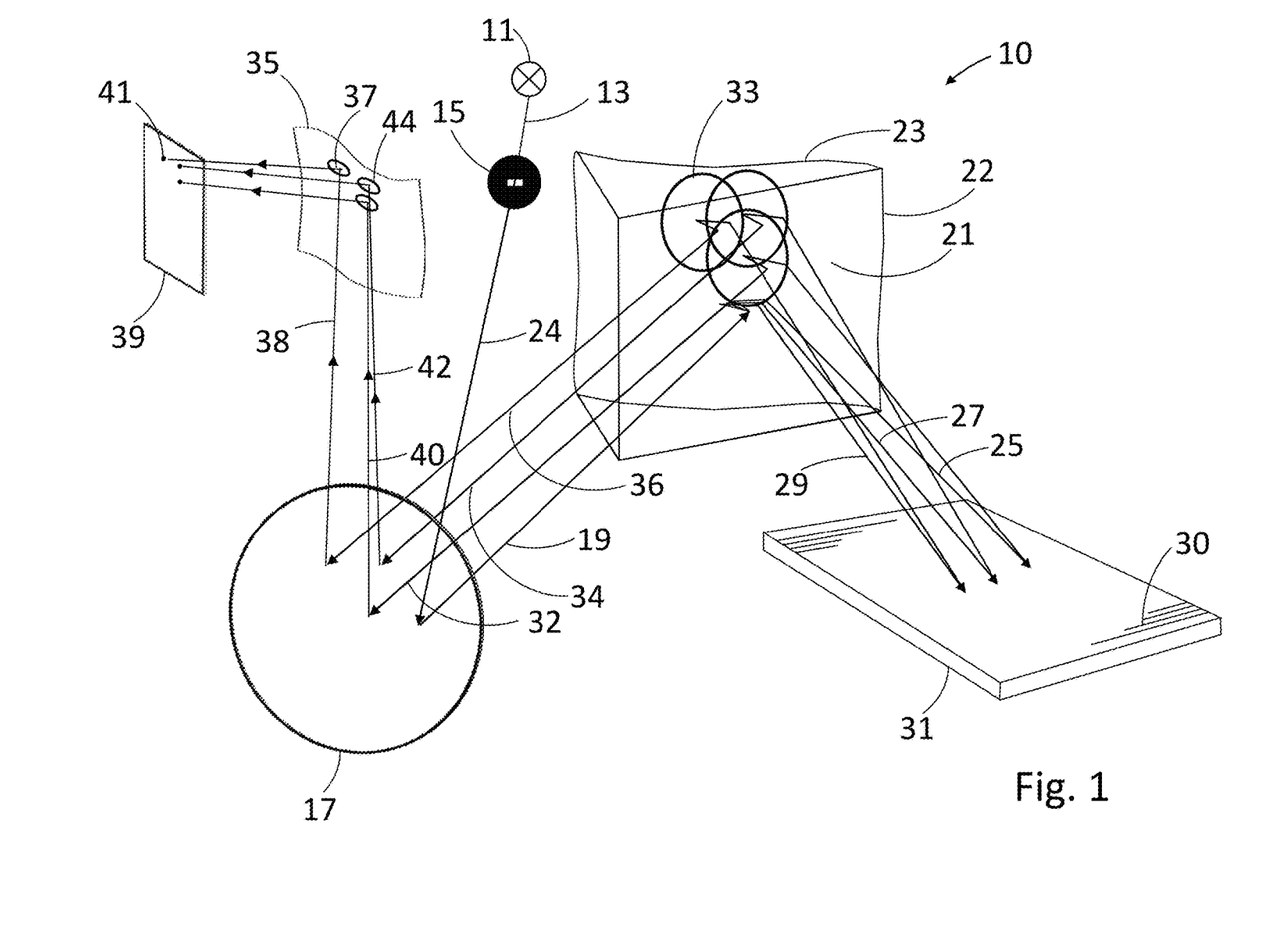
FIG. 1 shows a schematic representation of an echelle spectrometer arrangement with internal order separation in Littrow arrangement.

FIG. 1 is a schematic representation of an especially simple spectrometer arrangement 10. Spectrometer arrangement 10 includes an entrance slit 15, an off-axis paraboloid serving as collimator mirror 17, a rear-mirrored prism 21 and an echelle grating 31. Provided in the exit plane of the spectrometer arrangement 10 is a detector 39 for receiving the produced spectra. Arranged in front of the detector 39 is a turning mirror 35, which deflects the dispersed radiation in the direction of the detector 39. The roof edge 22 of the prism 21 extends essentially perpendicularly in the picture. The rulings of the echelle grating 31 are indicated by the lines 30.

Spectrometer arrangement 10 includes in addition to the above mentioned optical components other components, such as a housing, a baseplate, holder- and adjusting means, mechanical drives and electrical components for control of the optical components and for receiving and evaluating the signals on the detector 39. These are not shown for reasons of perspicuity.

Radiation enters from a radiation source 11 through the entrance slit 15 into the spectrometer arrangement 10, as shown by beam 24. Such a radiation source 11 is, for example, a xenon short arc, high pressure lamp or a deuterium radiator, such as are used for atomic absorption spectroscopy. Alternatively, the radiation of an emission source, for example, an inductively-coupled plasma source (ICP), can be imaged on the entrance slit. Depending on application, also lasers, hollow cathode lamps, mercury vapor lamps and the like can be used as radiation source 11. Finally, the arrangement is also suitable for spectral investigation of radiation sources.

The radiation 24 is collimated on the collimator mirror 17 to a parallel beam 19. The parallel beam 19 strikes the prism 21 at an angle of incidence a and is there, such as shown, dispersed in a cross dispersion direction. The cross dispersion direction is defined by the position of the prism 21. The beam 19 travels in the prism 21 to the mirrored rear side 23. There it is reflected and travels back anew through the prism 21. In the present example of an embodiment, the operation of the spectrometer is illustrated based on 3 different wavelengths. These are thus pre-dispersed in the prism in three different directions, as shown by the beams 25, 27 and 29. The angle of incidence on the prism 21 is so selected that the incoming beam 19 is well separated from the reflected beams 25, 27 and 29. The reflected, still parallel beams 25, 27 and 29 strike the echelle grating 31. There they are dispersed in a main dispersion direction. The main dispersion direction extends transversely to the cross dispersion direction.

The echelle grating 31 is positioned in such a manner that the radiation—still as parallel beams—travels with a very small angular offset back to the prism 21. There it is dispersed anew in the cross dispersion direction, reflected and dispersed yet again. The still parallel beams 32, 34 and 36 are then focused at the off-axis mirror 17, which this time forms the camera, into the image plane with the detector 39.

Arranged in front of the detector 39 is the turning mirror 35, with which the focused beams 38, 40 and 42 are deflected. The beams 38, 40 and 42 belonging to the different wavelengths are thus already separated shortly before the detector 39. This is illustrated for each beam 38, 40 and 42 by the strike surface 44 on the mirror 35. The deflected beams land then in the exit plane on the detector 39. The detector has a large number of detector elements 54 arranged in columns 50 and rows 52.

Figure 2:
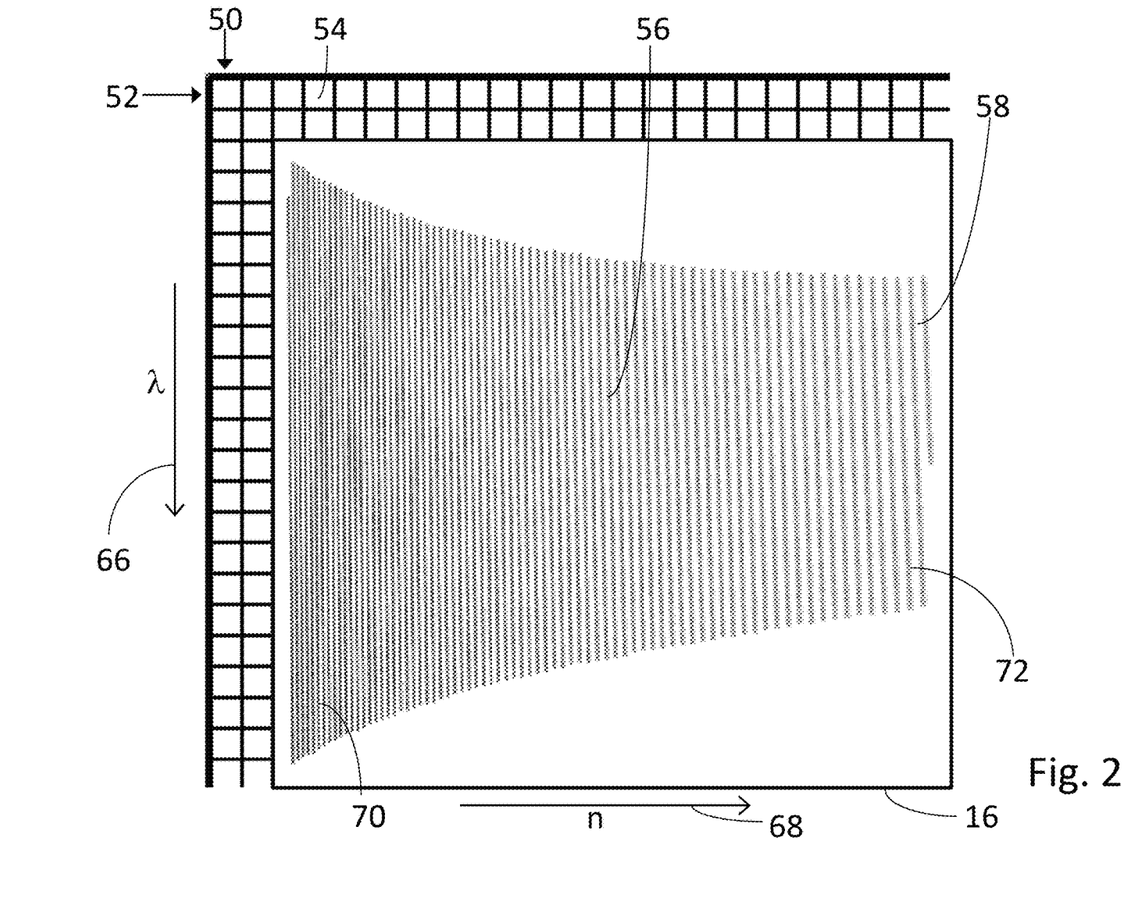
FIG. 2 shows, illustrated schematically, positions of the orders of an echelle spectrum on the detector.

In the exit plane, the orders 56 produced by the echelle grating 30 extend perpendicularly. A typical structure of an echelle spectrum is illustrated based on FIG. 2. The echelle grating produces a plurality n of orders 56. By the cross dispersion of the prism 21, the orders are separated transversely to the main dispersion direction. Between the orders 56 are order separations 58. In FIG. 2, the wavelength $\lambda$ rises within an order from the top down and it falls with the ordinal number n from left to right. This behavior is indicated by arrows 66 and 68. Correspondingly, greater wavelengths, e.g. the IR-region, lie left in the spectrum and lesser wavelengths, e.g. the UV-region, right in the spectrum. The prism dispersion is wavelength dependent in the case of the usually utilized materials. Correspondingly, the orders in the long-wave region 70 lie closer together. The order separations 58 increase toward the shortwave region 72. At the same time, a free spectral region, i.e. the length of an order, of the echelle grating is greater in the long-wave region. One can see in FIG. 2 that not only detector regions between the orders, but, instead, also in the edge region are unused.

The described arrangement is essentially that in DE 10 2009 059 280 A1. It requires only very few optical components. This enables the cost effective production of a spectrum with small reflection- and transmission losses coupled with high etendue and small device dimensions.

Figure 3:
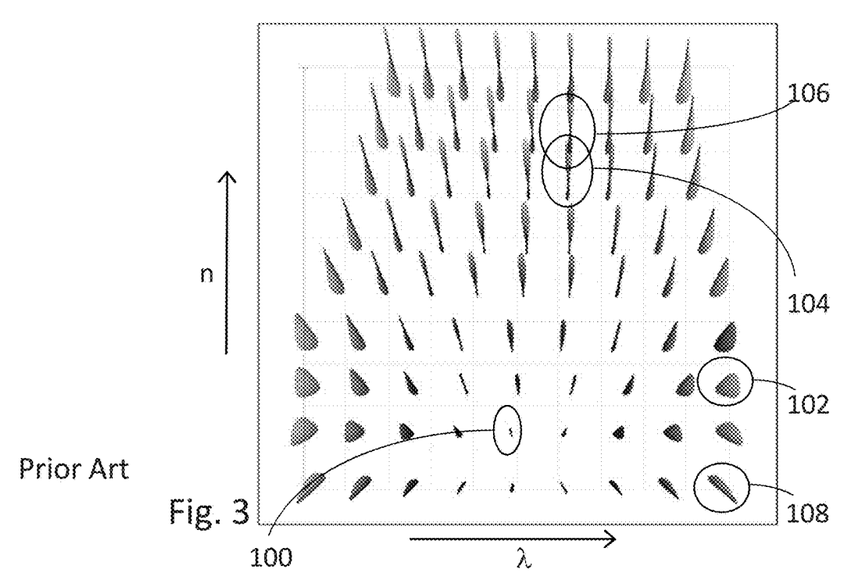
FIG. 3 shows images of the entrance slit in the exit plane for different wavelengths, which are uniformly distributed over the image field relevant for the spectral image in the case of an arrangement of the state of the area.
Figure 5:
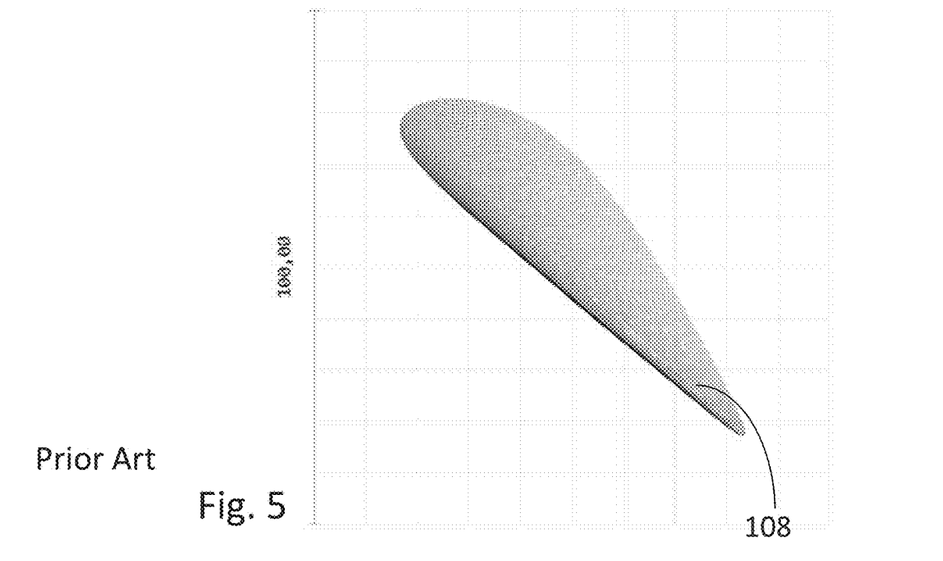
FIG. 5 shows an enlarged image of the entrance slit in the exit plane for one wavelength in the case of an arrangement of the state of the art.

Images produced in the image plane of a point light source with a plurality of discrete wavelengths are shown in FIG. 3. The image 102 is an example of an image of a point light source in the case of a certain wavelength. The images of the point light source are enlarged by a factor of 20 compared with the detector area. In this case, a planar turning mirror was used. One can see that area occupied by the beam of a wavelength is differently large in different regions. Especially, the expansions in main- and cross dispersion directions are not equal. The spot 100 has small expansions in both directions. A spot 102 of equal order lying on the edge of the image field occupies, in contrast, a rather large area. It is certainly possible in the case of these shapes to record and to add up the signal with a plurality of detector elements. The signal has then, however, also a greater offset due to the dark current at each of the detector elements 54. Because of the read-out noise for each detector element, additionally signal/noise ratio of the total signal lessens. The spots 104 and 106 in higher orders have very large expansions in the direction of the cross dispersion. FIG. 5 shows a typical spot 108 from the edge region in detail, with dimensions of around 80 micrometer.

For the described spectrometer, now freeform surfaces are defined, which over the entire relevant image field minimize the totality of imaging errors. A first freeform surface is formed on the turning mirror 35. A second freeform surface is formed on the prism 23.

For manufacturing a suitable freeform surface, firstly, its shape must be defined. For this, the performance of an optimizing algorithm is required. In the present example of an embodiment, an optical model for the above spectrometer is selected, whose properties without freeform surface are already optimized as regards the image quality by choice of a parabolic collimator mirror and Littrow arrangement such as above described. The goal is the further improvement of the image quality of selected parts of the image field by replacing existing mirror surfaces. The mirror surfaces are freely mathematically describable. In the present example of an embodiment, two existing planar mirror surfaces are replaced by reflecting freeform surfaces. Of course, additional freeform surfaces can be used, which are added to the optics.

Freeform surfaces are used, which have a basic form without edges and jumps and which are continuous corresponding to the imaging errors.

In the present example of an embodiment, the optimizing occurs by means of a beam calculation program. Thus, no light source is required, but, instead, the light source can be selected, so that it has all properties required for the calculation. Within the image field, a group of point images representative for the total spectrum is define. Point images are different spectral images of a single field point in the entrance slit plane. In equal manner, however, also images of a plurality of points can be used. Especially in the case of small slits, one field point is sufficient. In the present example of an embodiment, a dense point image network was used. Such requires, indeed, a greater computing power for the surface optimizing, but yields a better quality of the calculated solution.

In the present example of an embodiment, the surfaces of the turning mirror 35 and the prism rear side 23 are described by means of Chebyshev polynomials (of first type), which are defined by their parameters. The mathematical expression for a surface description by means of Chebyshev polynomials of first type becomes:

$$z = \underbrace{\frac{c(x^2+y^2)}{1+\sqrt{1-c^2(x^2+y^2)}}}_{\text{basic form (spherical surface)}} + \underbrace{\sum_{i=0}^{N}\sum_{j=0}^{M} c_{ij} \cdot T_i(X) \cdot T_j(Y)}_{\substack{\text{deviation from the basic form} \\ \text{Chebyshev polynomials}}}$$

z is the dependent surface coordinate (applicate), x and y are the independent local coordinates. X and Y are (in contrast to x and y) normalized coordinates (corresponding to the size of the surface). For optimizing the surface form, the polynomial degrees N and M are fixed in both dimensions and various parameters are freed, especially some or all polynomial coefficients $c_{ij}$, and even e.g. the curvature c of the basic spherical form.

One-dimensional Chebyshev polynomials have the form:

$T_n(k) = \cos(n \cos^{-1}(k))$, $n = 0 \ldots \infty$, $k \in [-1,1]$ where k is the independent local coordinate, and n is the polynomial degree.

In the case of the example of an embodiment, a polynomial degree of 4×4 was selected for the two surfaces. As free parameters for optimizing the freeform surface, all coefficients $c_{ij}$ and the curvatures c of the surfaces were selected. Additionally, other parameters of the optical model were freed, such as the detector inclination or the separation between detector and freeform mirror. For the optimizing, sufficiently many image points are used, in order to correspond to the used polynomial degree.

The parameters are defined, which are allowed to vary in the optimizing. To this belongs also the definition of boundary conditions. Thus, the mirror size is not permitted to exceed a selected value, in order to avoid vignetting. Another important boundary condition is the maintaining of the spectra geometry on the detector starting from the spectrum image of a construction without freeform surfaces. As a result, a target position on the detector for the individual images of the entrance slit is predetermined in the merit function. The weighting for maintaining these positions is, however, set very low, in order to allow certain distortions of the spectrum. Different from e.g. the case in photography (keyword: distortion), these are without problem in the recording of a spectrum image. Allowing a certain amount of distortion of the two-dimensional spectrum structure in the optimizing acts very positively on the quality of the solution as regards image sharpness.

Additionally, certain freeform parameters can be fixed, for example, fulfilling a symmetry requirement at the surface.

Besides the mathematical description of the freeform surface, also the images in the image plane are to be mathematically described. These descriptions flow into the calculation of the value of the merit function. The merit function includes the mathematically expressed goals for optimizing and their relative weighting. The smaller the value of the merit function, the better the optical arrangement fulfills the goals. In the present example of an embodiment, the totality of the deviations from stigmatic images for the considered wavelengths is calculated and minimized. In the illustrated case, the goal of minimizing the deviation from stigmatic imaging for the individually considered wavelengths is equally weighted among one another. However, for each individual image the goal of minimizing the deviation from stigmatic imaging is weighted in the main dispersion direction 10× higher than in the cross dispersion direction. Additionally, the weighting for obtaining the geometry of the spectrum starting from the spectrum image in the arrangement without freeform surfaces compared with the minimizing of the aberrations is weighted 10,000× less.

Figure 4:
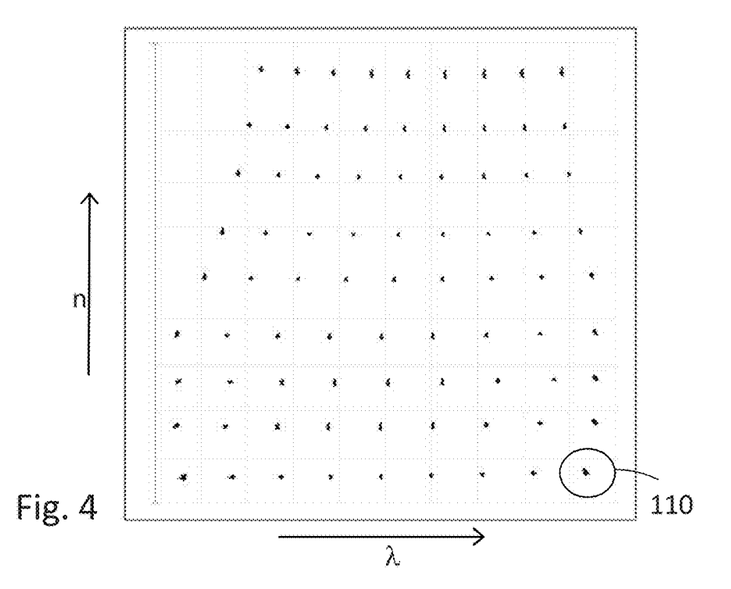
FIG. 4 shows images of the entrance slit analogously to FIG. 3 with an arrangement of the invention with optimized freeform surfaces.
Figure 6:
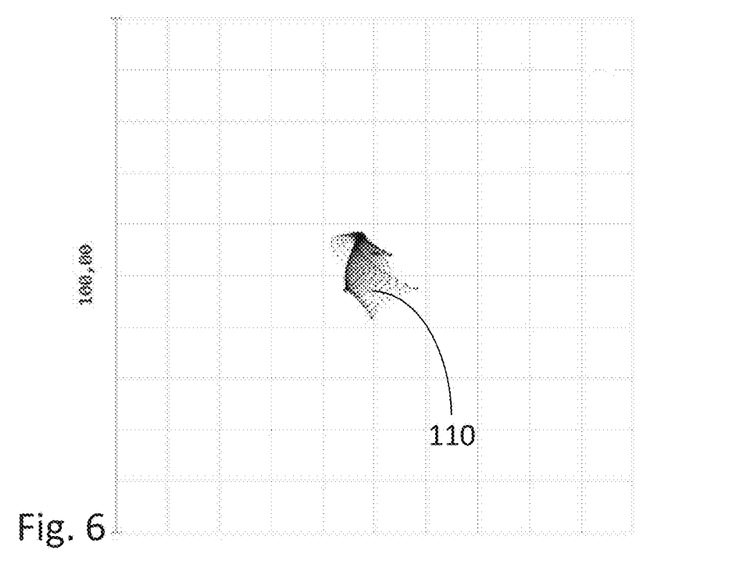
FIG. 6 shows an enlarged image of the entrance slit analogously to FIG. 5 in the case of an arrangement of the invention with optimized freeform surfaces.

The result is shown in FIG. 4 and in detail in FIG. 6. One can see that the spot 110 is significantly smaller than in FIGS. 3 and 5. As in FIG. 3, the images of the point light source are enlarged in FIG. 4 as compared with the detector area by a factor of 20. The light is concentrated on a significantly smaller number of detector elements, so that the dark current and the read-out noise are less. The orders can in a second step be placed closer together, so that fewer detectors can be used. The images of the entrance slit for different wavelengths are narrow and overlap less. In this way, the spectral resolution is greater. On the whole, the spectrum is better detectable.

Figure 7:
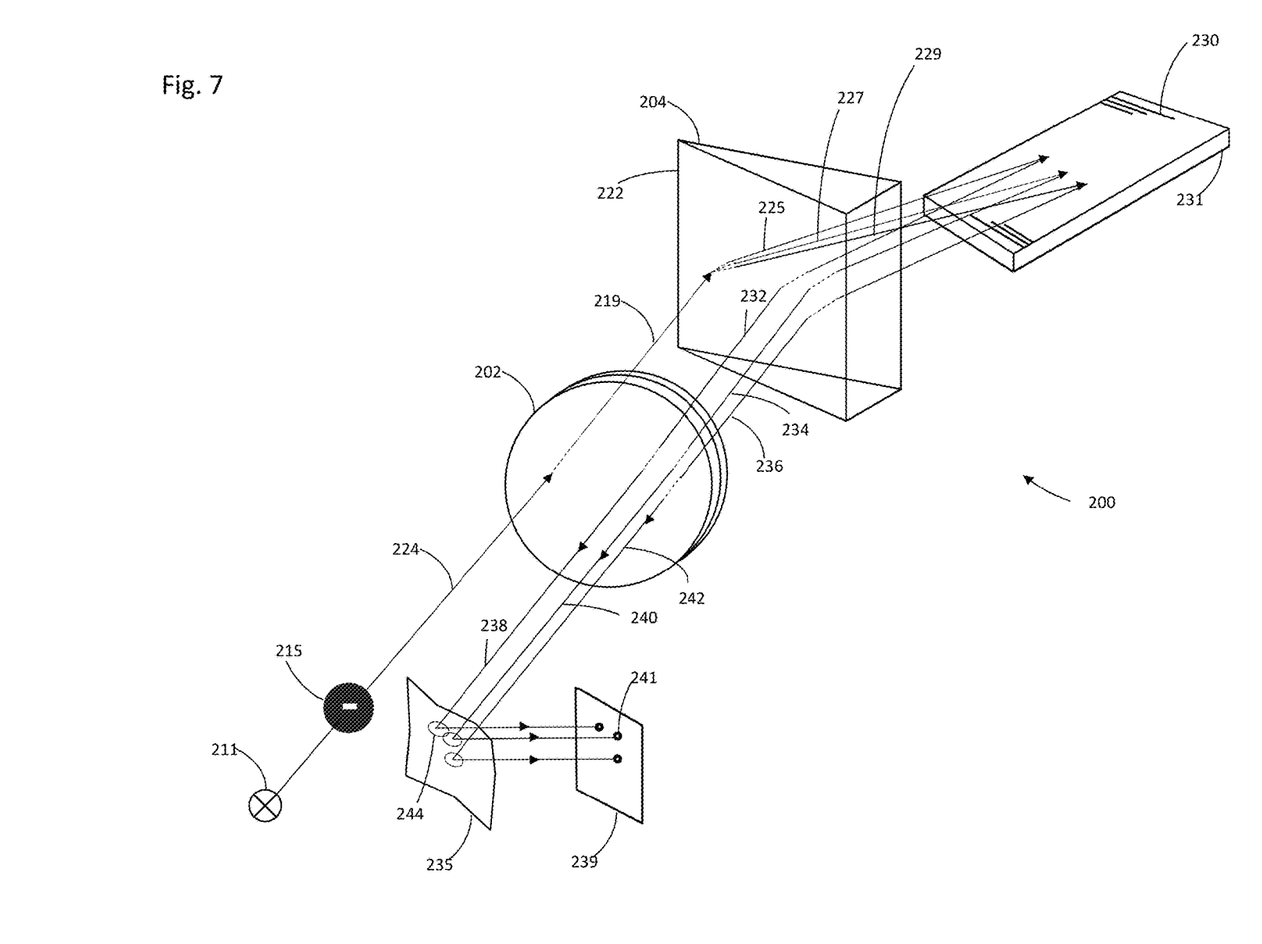
FIG. 7 shows a schematic representation of an echelle spectrometer arrangement with internal order separation in Littrow arrangement with a lens optics.

FIG. 7 shows, schematically, another especially suitable spectrometer arrangement 200. The arrangement includes a radiation source 211, an entrance slit 215, an achromatic lens doublet 202, a purely transmissive prism 204, whose roof edge 222 extends essentially perpendicularly in the picture, and an echelle grating 231. Provided in the exit plane of the spectrometer arrangement 200 is a detector 239 for recording the produced spectra. Arranged before the detector 239 is a turning mirror 235, with which the dispersed radiation is deflected to the detector 239.

The radiation emitted from the source 211 is directed through the entrance slit 215 into the actual spectrometer. The radiation travels from the slit to the achromatic lens doublet 202, which collimates the radiation. The radiation travels from the lens combination as parallel beam 219 to the transmissive prism 204, which disperses the radiation, such as shown, in the cross dispersion direction. The dispersed radiation, as shown by the parallel beams 225, 227 and 229 of three different wavelengths, travels to the echelle grating 231, where the three beams are also dispersed in the main dispersion direction.

The radiation travels with a very small angular offset back to the prism 202. There, it is dispersed anew in the cross dispersion direction. The still parallel beams 232, 234 and 236 are then focused by the lens doublet 202, which this time functions as camera, into the image plane with the detector 239.

Arranged before the detector 239 is the turning mirror 235, with which the focused beams 238, 240 and 242 are deflected. The beams 238, 240 and 242 belonging to the different wavelengths are thus shortly before the detector 239 already quite well separated—the relative beam overlapping is small. This is illustrated by the strike surface 244 for each beam 238, 240 and 242 on the mirror 235. The deflected beams then strike the detector 239 at the exit plane.

The typical spectrum form produced on the detector 239 by the echelle grating 231 and prism 204, corresponds, again, to the diffraction order structure illustrated in FIG. 2.

The shown spectrometer arrangement 200 corresponds to a Littrow arrangement. Littrow arrangements have a low number of optical components and therewith low radiation losses and can be built very compactly. Littrow spectrometers with lens optics as collimator-, or camera optics, are typically applied only for spectrometers with very narrow wavelength ranges. The reason for this is the wavelength dependent errors (chromatic aberration), which are introduced unavoidably by a lens optics. In the present case, problematic is especially the longitudinal chromatic aberration, i.e. the dependence of the focal length of a lens or a lens system on the wavelength.

Figure 8:
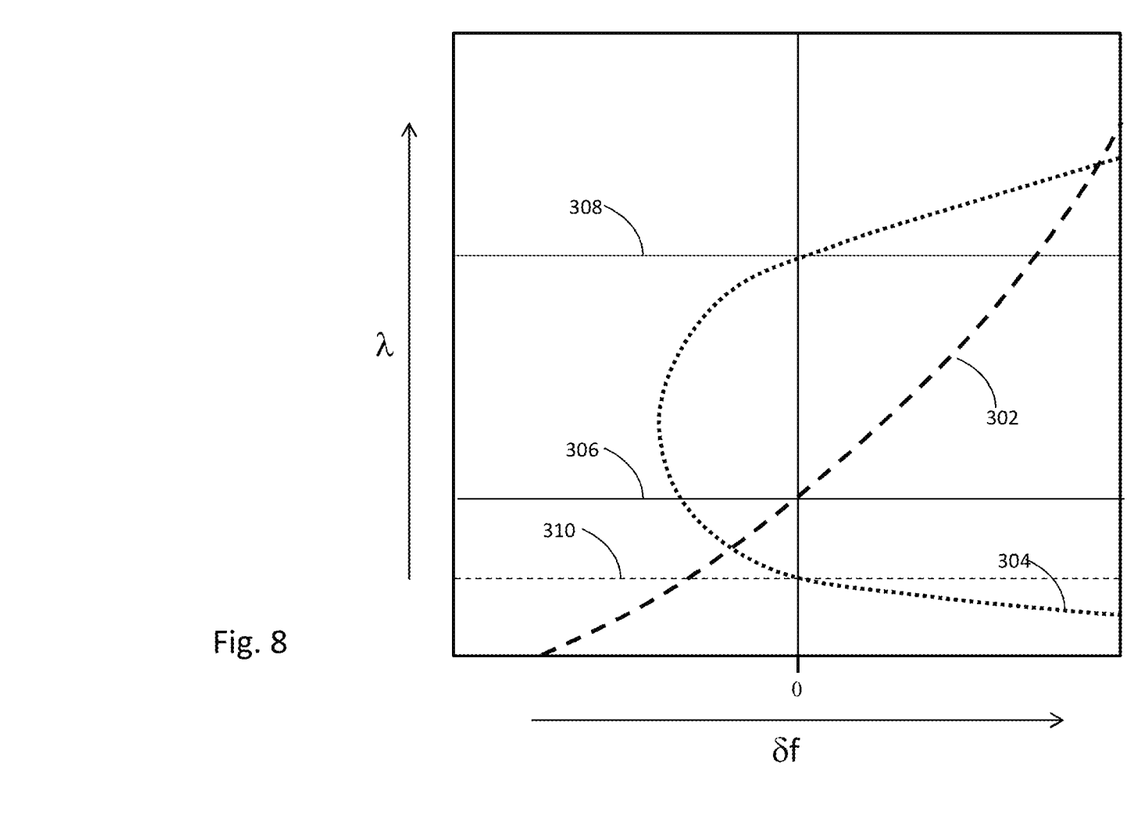
FIG. 8 shows a dependence of the longitudinal chromatic error $\delta f$ as a function of wavelength $\lambda$ for a simple lens and an achromatic lens doublet.

For reducing the longitudinal chromatic error, achromatic lens combinations can be used. Achromatic lens doublets are formed typically of a concave, highly refracting lens, for example, of flint-glass, and a convex lens with less dispersion, for example, of crown glass. Such a combination permits eliminating the focus error and spherical aberration for two design wavelengths. FIG. 8 shows the dependence of the longitudinal chromatic error $\delta f$ as a function of wavelength $\lambda$ for a simple lens 302 and an achromatic lens doublet 304. For simple lens, the focus error $\delta f$ can only be eliminated for one wavelength 306, and, in the case of an achromatic doublet, for two wavelengths 308 and 310.

Figure 9:
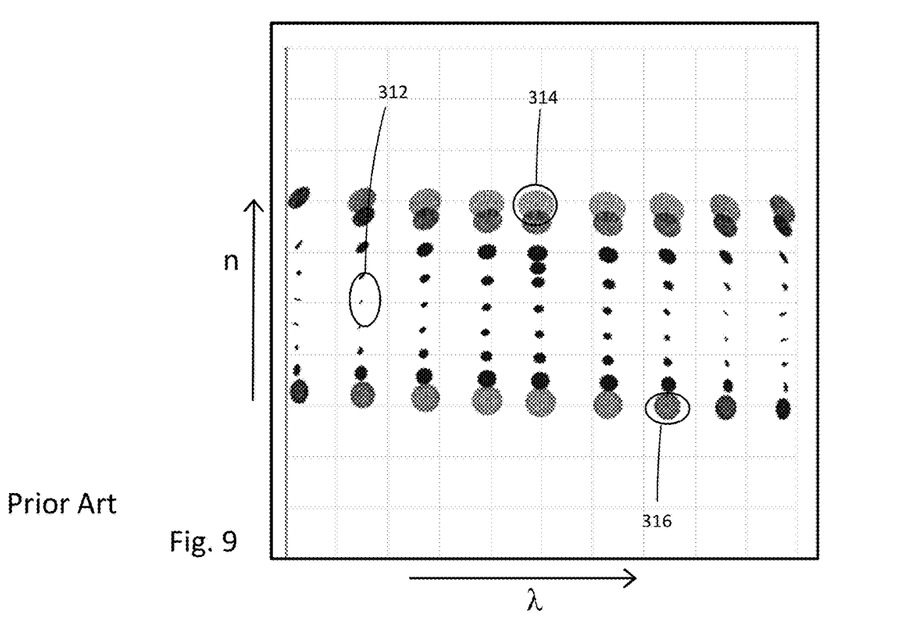
FIG. 9 shows the images of a point light source of different wavelengths, as produced by the spectrometer construction of FIG. 7 in the image plane.

FIG. 9 shows the images of a point light source of different wavelengths produced by the above described spectrometer construction in the image plane. The spectrometer produces a spectrum in the region between 600 nm and 100 nm wavelength. Used as collimator and camera is an achromatic lens doublet with design wavelengths of 700 nm and 900 nm. Applied as turning mirror 35 before the detector is a planar mirror. The detector is here so positioned that centrally between the two design wavelengths the aberrations (geometric plus chromatic aberrations) are minimum—here as shown by the image point 312. Toward the edges of the spectrum, the aberrations strongly increase—the occupied areas of the point light source images are greater. The images are enlarged both in the main dispersion direction, as well as also in the cross dispersion direction. Mostly, the remaining longitudinal chromatic aberration, present because of the achromatic lens doublet, can be noticed as a local defocusing. Representative of this are the two image points 314 and 316 on the upper and lower ends of the wavelength region.

For additional correction of the arising aberrations over the entire image field, especially for minimizing the chromatic error, the turning mirror 35 before the detector 39 can be converted to a freeform surface. The mathematical surface description, the determining of the freely variable parameters in the optical model and the procedure for surface optimization are the same as described in the first example of an embodiment.

Figure 10:
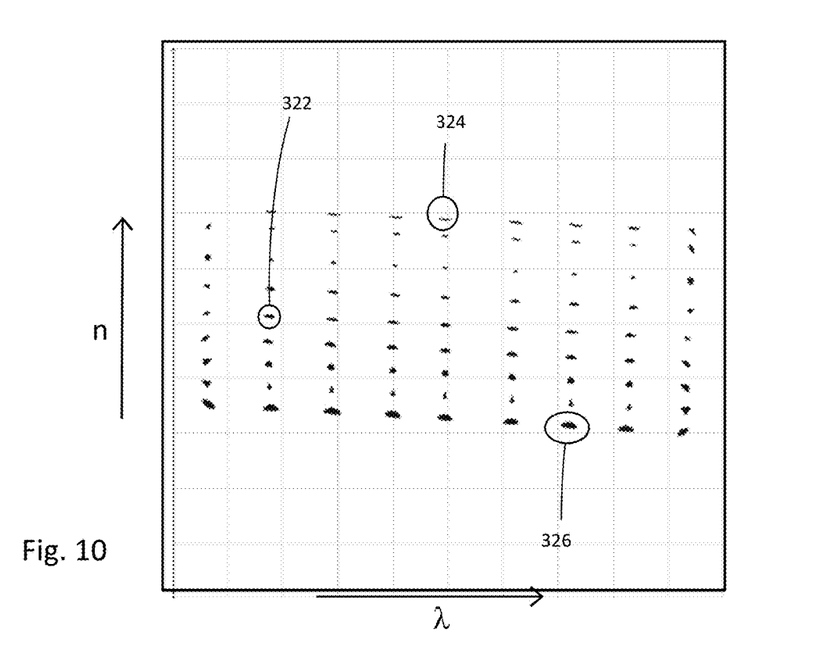
FIG. 10 shows the achievable improvement of the image quality over the entire image field.

The so achievable improvement of the image quality over the entire image field is shown in FIG. 10. One can see that especially on the edge of the wavelength region (image points 324 and 326) the images of the point light source are many times smaller than the corresponding image points of equal wavelength in a construction without freeform correction mirrorl(FIG. 9: 314, 316). As in FIG. 9, the images of the point light source in FIG. 10 are enlarged compared with the detector area by a factor of 20. The light is concentrated on a significantly lesser number of detector elements, so that the dark current and the read-out noise are less. The orders can in a second step be brought closer together, so that fewer detectors can be used. The images of the entrance slit for different wavelengths are narrower and overlap less. In this way, the spectral resolution is greater. On the whole, the spectrum is better detectable.

The invention claimed is:

1. A spectrometer arrangement with a two-dimensional spectrum, comprising:
    a first dispersing element embodied to spectrally separate radiation in a main dispersion direction to yield dispersed, monochromatic beams, wherein the first dispersing element is an echelle grating;
    an imaging optics embodied to image the radiation entering into the spectrometer arrangement through an entrance slit along a beam path in an image plane for producing a two-dimensional spectrum;
    a detector array having a two-dimensional arrangement of a plurality of detector elements in the image plane;
    a second dispersing element embodied for order separation using spectral separation of the radiation in a cross dispersion direction, thereby forming an angle with the main dispersion direction of the first dispersing element such that a two-dimensional spectrum is producible; and
    a reflector, a refractor, a lens array and/or other optical element arranged in the beam path at a location where the dispersed, monochromatic beams are separated from one another,
    wherein the reflector, the refractor, the lens array and/or the other optical element has a freeform surface such that area occupied by selected images of the entrance slit of different wavelengths in the image plane is optimized over a selected spectral region of the two-dimensional spectrum;
    wherein the freeform surface is arranged at a position where relative beam overlapping is less than on a camera mirror element, wherein the relative beam overlapping at the position in the beam path is a reciprocal arithmetic ratio between a beam cross-sectional area of a selected monochromatic beam at the position and an area portion thereof, which is likewise occupied by a second monochromatic beam.

2. The spectrometer arrangement of claim 1, wherein the freeform surface is embodied such that an imaging error caused totality of deviations from a stigmatic imaging of the selected images of the entrance slit for different wavelengths in the image plane is minimized over the selected spectral region of the two-dimensional spectrum.

3. The spectrometer arrangement of claim 1, wherein the spectrometer arrangement is an echelle spectrometer with internal order separation.

4. The spectrometer arrangement of claim 1, wherein a reflecting, refracting or diffracting surface is arranged at a location in the beam path where at least two monochromatic beams associated with the same echelle diffraction order are completely separated and/or where at least two monochromatic beams, which do not belong to the same echelle diffraction order, are completely separated, and wherein the reflecting, refracting or diffracting surface is embodied as a freeform surface that minimizes deviation from a stigmatic imaging on the detector array for the individual monochromatic beams over a selected wavelength range of the two-dimensional echelle spectrum independently of one another.

5. The spectrometer arrangement of claim 1, wherein the first dispersing element, the second dispersing element, the imaging optics, the reflector, the refractor, the lens array and/or the other optical element are embodied such that monochromatic beams of at least two wavelengths of the same main dispersion order within the free spectral region are completely separated at the freeform surface and/or monochromatic beams of two points in the entrance slit with different positions of slit height are completely separated at the freeform surface.

6. The spectrometer arrangement of claim 1, wherein the freeform surface is optimized in such a manner that a sum of RMS functions of the selected images of the entrance slit in the selected spectral region assumes a minimum.

7. The spectrometer arrangement of claim 1, wherein the freeform surface is optimized such that a sum of wavefront errors of the selected images of the entrance slit in the selected spectral region assumes a minimum.

8. The spectrometer arrangement of claim 1, wherein the freeform surface is optimized such that a sum of the areas of the selected images of the entrance slit in the selected spectral region assumes a minimum.

9. The spectrometer arrangement of claim 1, wherein the reflector or other optical element having the freeform surface is a folding mirror located before the image plane.

10. The spectrometer arrangement of claim 1, wherein the imaging optics is arranged in a Littrow arrangement.

11. The spectrometer arrangement of claim 1, wherein the second dispersing element is a prism including a freeform surface, and the freeform surfaces have a shape adapted such that the imaging error caused deviations from a stigmatic imaging of the selected images of the entrance slit of different wavelengths in the image plane are optimized over a selected spectral region of the two-dimensional echelle spectrum.

12. The spectrometer arrangement of claim 1, wherein at least one freeform surface is embodied such that the orders assume a selected position in the image plane and have substantially uniform separations in the image plane.

13. The spectrometer arrangement of claim 1, wherein the freeform surface is formed from a plurality of micro mirrors or by another adaptive optical element, whose shape and/or position is adjustable using corresponding actuators.

14. The spectrometer arrangement of claim 1, wherein the imaging optics is embodied with spherical mirrors and at least one surface of an optical element in the beam path is embodied as a freeform surface optimized such that the totality of the deviations from a stigmatic imaging for selected images of the entrance slit is minimized in the relevant wavelength range.

15. The spectrometer arrangement of claim 1, wherein the imaging optics comprises a lens or a lens system.

16. An optical component, comprising:
a freeform surface embodied to optimize imaging error caused area occupied by selected images of an entrance slit of a spectrometer of different wavelengths in an image plane over a selected spectral region of a two-dimensional echelle spectrum, wherein the optical component is adapted for retrofitting a spectrometer arrangement, the spectrometer arrangement including:
a first dispersing element embodied to spectrally separate radiation in a main dispersion direction to yield dispersed, monochromatic beams, wherein the first dispersing element is an echelle grating;
an imaging optics embodied to image the radiation entering into the spectrometer arrangement through the entrance slit along a beam path in the image plane for producing a two-dimensional echelle spectrum;
a detector array having a two-dimensional arrangement of a plurality of detector elements in the image plane;
a second dispersing element embodied for order separation using spectral separation of the radiation in a cross dispersion direction, thereby forming an angle with the main dispersion direction of the first dispersing element such that a two-dimensional spectrum is producible; and
a reflector, a refractor, a lens array and/or other optical element arranged in the beam path at a location where the dispersed, monochromatic beams are separated from one another,
wherein the freeform surface is included on the reflector, the refractor, the lens array and/or the other optical element,
wherein the freeform surface is arranged at a position where relative beam overlapping is less than on a camera mirror element, wherein the relative beam overlapping at the position in the beam path is a reciprocal arithmetic ratio between a beam cross-sectional area of a selected monochromatic beam at the position and an area portion thereof, which is likewise occupied by a second monochromatic beam.

* * * * *